United States Patent [19]
Hirons

[11] 3,867,859
[45] Feb. 25, 1975

[54] MACHINE FOR FORMING INDICIA FOR SAND BLASTING

[76] Inventor: John L. Hirons, Rt. 1, Box 28, Mount Orab, Ohio 45154

[22] Filed: Feb. 6, 1974

[21] Appl. No.: 439,911

[52] U.S. Cl............................ 83/284, 83/1, 83/510, 83/520
[51] Int. Cl.............................................. B26d 1/56
[58] Field of Search............ 83/284, 1, 6, 520, 652, 83/653–657, 510; 101/5, 6, 22, 23, 128.2, 128.4

[56] References Cited
UNITED STATES PATENTS
| | | | |
|---|---|---|---|
| 2,168,401 | 8/1939 | Evers | 83/284 |
| 3,199,390 | 8/1965 | Arnould et al. | 83/284 |
| 3,469,488 | 9/1969 | Gaspari | 83/652 |
| 3,800,641 | 4/1974 | Spengler | 83/284 X |

Primary Examiner—Frank T. Yost
Attorney, Agent, or Firm—James W. Peare; Roy F. Schaeperklaus

[57] ABSTRACT

A machine for forming indicia from a sheet of rubber like material for use in sandblasting. The machine includes a carriage table portion having a lower bearing face and an upper sheet supporting face. A plate of transparent material is hinged to the table portion and adapted to overlie the sheet supporting face. The sheet supporting face supports the sheet with cutting tools arranged thereon. The carriage is advanced between rollers to cause the plate to be urged against the cutting tools to cause the cutting tools to cut indicia from the sheet.

4 Claims, 9 Drawing Figures

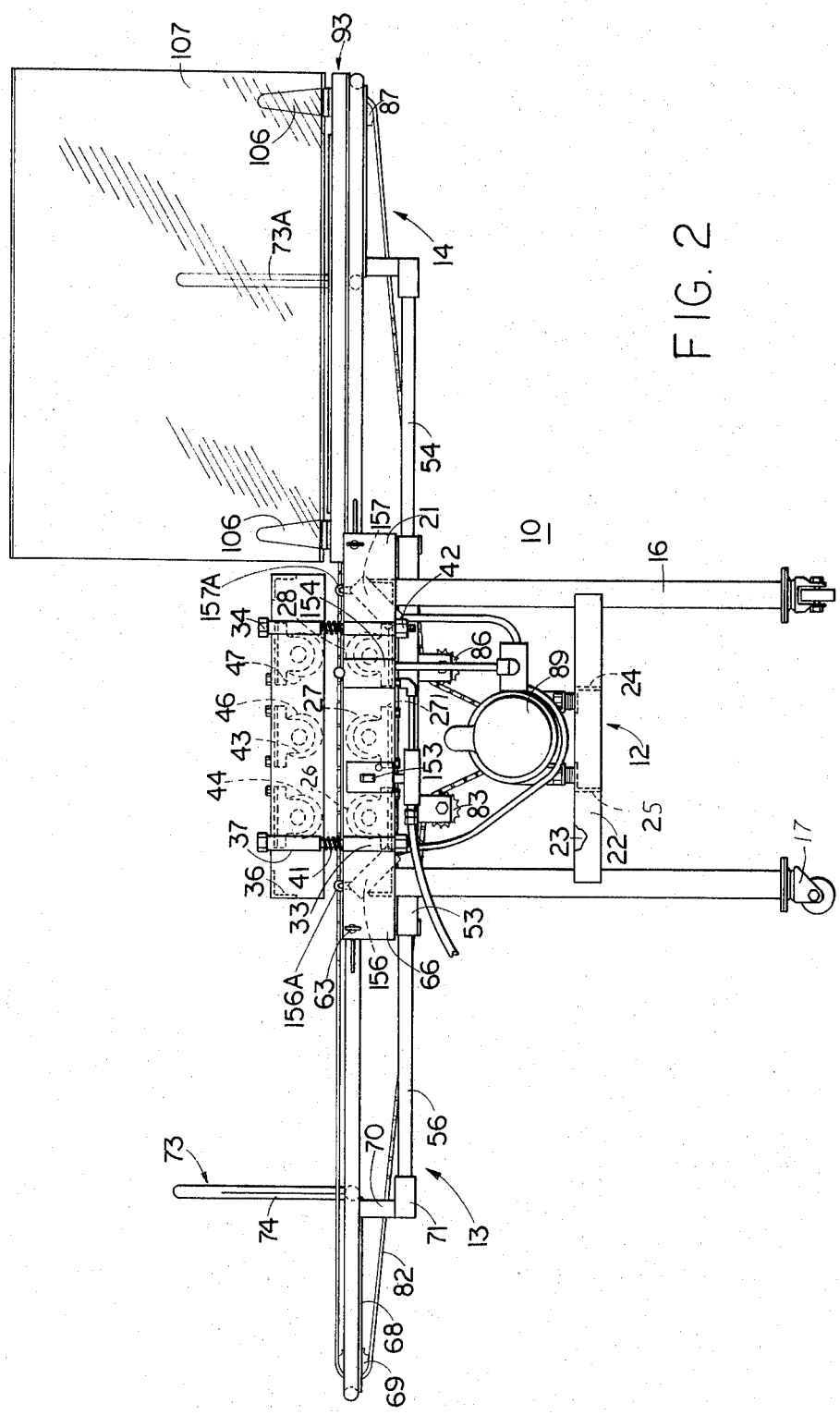

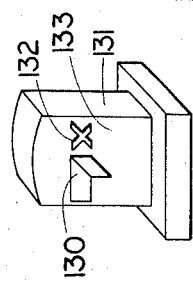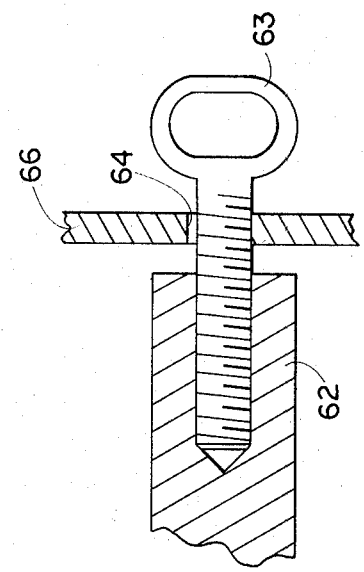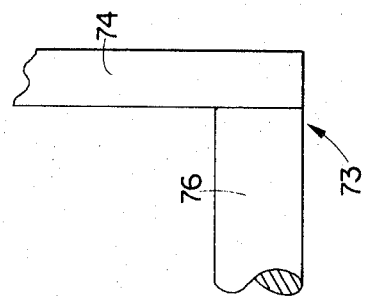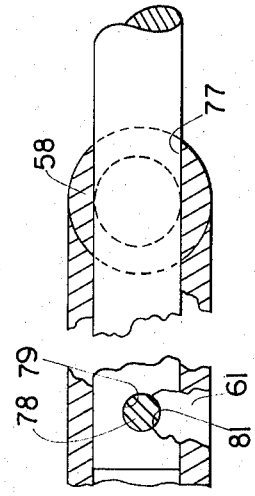

MACHINE FOR FORMING INDICIA FOR SAND BLASTING

This invention relates to a machine for forming lettering or other indicia for use in sandblasting insignia on a stone for a grave marker or the like.

In the preparation of a grave marking stone, it is common practice to form letters of rubber or other rubber-like material, which are adhesively attached to a surface of the stone prior to sandblasting so that the stone around the rubber letters is cut away by the sandblast while the surface is preserved under the rubber letters, and relief letters are formed on the stone which correspond to the rubber letters.

An object of this invention is to provide a machine for cutting letters from a sheet of rubber or the like for use in applying to a stone surface prior to sandblasting.

A further object of this invention is to provide a machine which cuts a plurality of letters from a single sheet of rubber or the like with the letters being arranged in a strip in the form of the indicia to be provided on the stone surface.

A further object of this invention is to provide such a machine which has a transparent cover which overlies cutting tools as the cutting tools cut the letters in the rubber sheet so that the positioning of the cutting tools can be observed as the letters are being cut.

Briefly, this invention provides an indicia forming machine which includes a frame on which a carriage can move. The carriage includes a flat table on which a sheet of rubber can be supported. Letter cutting tools can be mounted on the rubber sheet. A transparent plate is hinged to the table and can be swung downwardly into engagement with the tools in flatwise relation therewith. The position of the tools can be observed through the transparent plate to ensure that the letter cutting tools are properly positioned. The carriage is then advanced to bring the table and the transparent plate between rolls which force the plate toward the table to cause the tools to cut letters from the rubber sheet.

The above and other objects and features of the invention will be apparent to those skilled in the art to which this invention pertains from the following detailed description and the drawings, in which:

FIG. 2 is a view in side elevation of the machine shown in FIG. 1;

FIG. 6 is a view in section taken on an enlarged scale on the line 6—6 in FIG. 1;

FIG. 7 is a fragmentary view in section taken on an enlarged scale on the line 7—7 in FIG. 1;

FIG. 8 is a perspective view showing a gravestone with indicia formed by the machine partly applied thereto.

In the following detailed description and the drawings, like reference characters indicate like parts.

Figure 1:
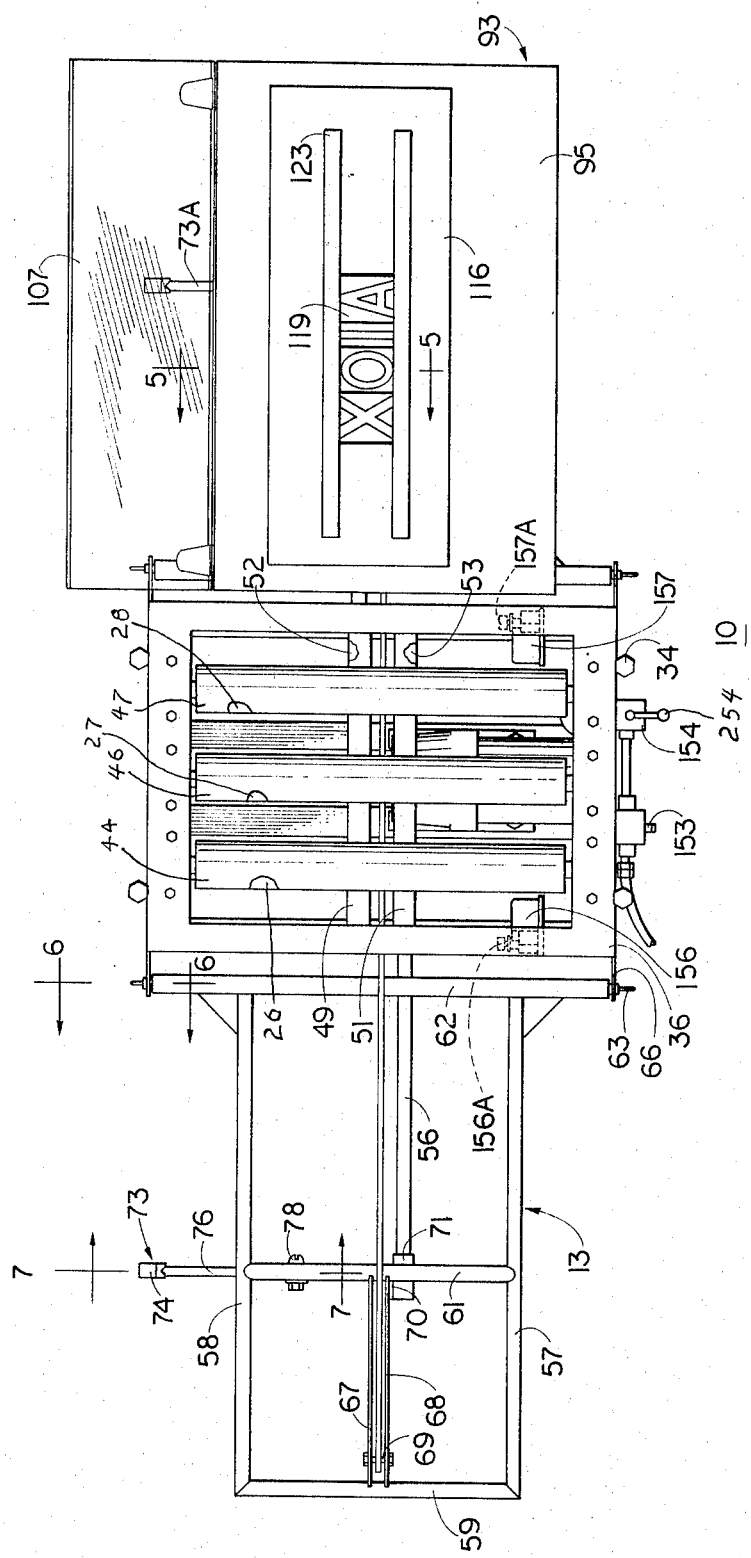
FIG. 1 is a plan view of an indicia cutting machine constructed in accordance with an embodiment of this invention.

In FIGS. 1 and 2 is shown a machine 10 constructed in accordance with an embodiment of this invention. The machine 10 includes a main frame 12 (FIG. 2) and cantilever side frames 13 and 14. The main frame 12 includes upright tubular legs 16, each of which is supported on a caster assembly 17. A lower rectangular frame 21 is mounted on and connects upper ends of the legs 16. The legs 16 are also connected by cross frames 22 and 23 and motor support angle frames 24 and 25, which extend between the cross frames 22 and 23. Bearings 271 are mounted on the rectangular frame 21 and rotatably support rollers 26, 27, and 28 (FIG. 2), which extend transversely of the rectangular frame 21.

Figure 3:
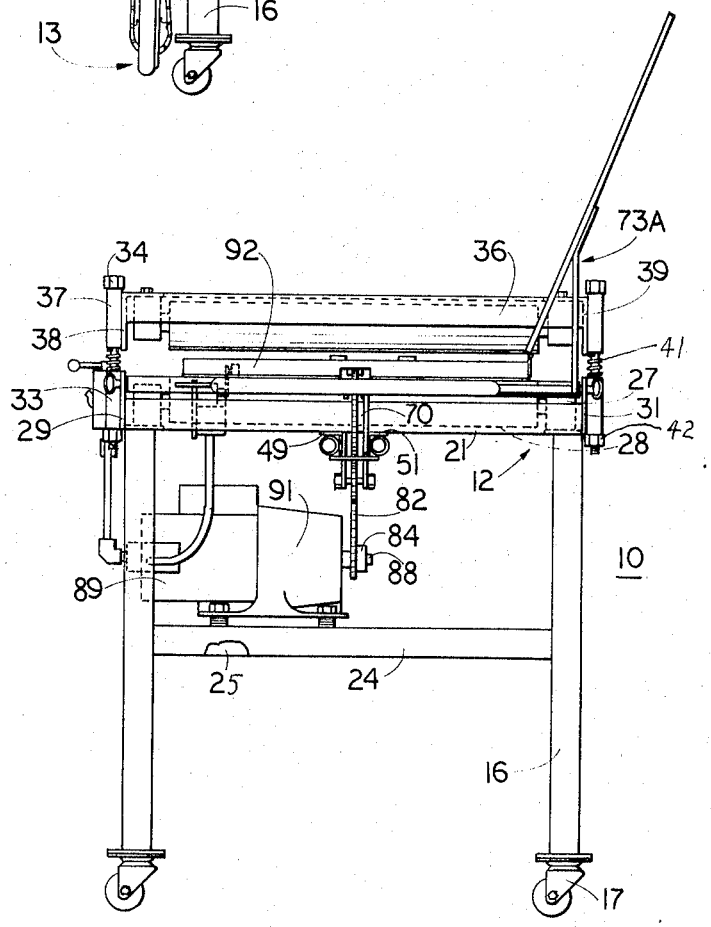
FIG. 3 is a view in end elevation of the machine shown in FIGS. 1 and 2, a cantilever frame support being partly broken away to reveal structural details.

Side walls 29 and 31 (FIG. 3) of the rectangular frame 21 carry upright tubular guides 33. Each of the upright tubular guides 33 supports an upright bolt 34. An upper, movable rectangular frame 36 is mounted on the bolts 34. Upright tubular guides 37 are mounted on side walls 38 and 39 (FIG. 3) of the upper rectangular frame 36. Each of the bolts 34 extends through one of the upright tubular guides 37 of the upper rectangular frame 36 with a compression spring 41 being mounted on the shank of the bolt 34 between the associated tubular guide 33 and the associated tubular guide 37 so that the upper rectangular frame 36 is resiliently urged upwardly to the position shown in FIG. 2 spaced above the lower or stationary rectangular frame 21. Nuts 42 threaded on the bolts 34 can be turned to adjust the height of the upper rectangular frame 36 and to level the upper rectangular frame 36. Bearings 43 (FIG. 2) are mounted on the upper rectangular frame 36 and rotatably support rollers 44, 46, and 47, each of which overlies and is aligned with one of the rollers 26, 27, and 28 supported on the lower rectangular frame 21. Spaced angle-shaped lengthwise extending supports 49 and 51 (FIGS. 1 and 3) are attached to the underside of the lower rectangular frame 21. Horizontal tubular members 52 and 53 (FIG. 1) are attached to the angle supports 49 and 51, respectively. Side frame support rods 54 and 56 (FIG. 2) are housed in the horizontal tubular members 52 and 53, respectively.

Figure 4:
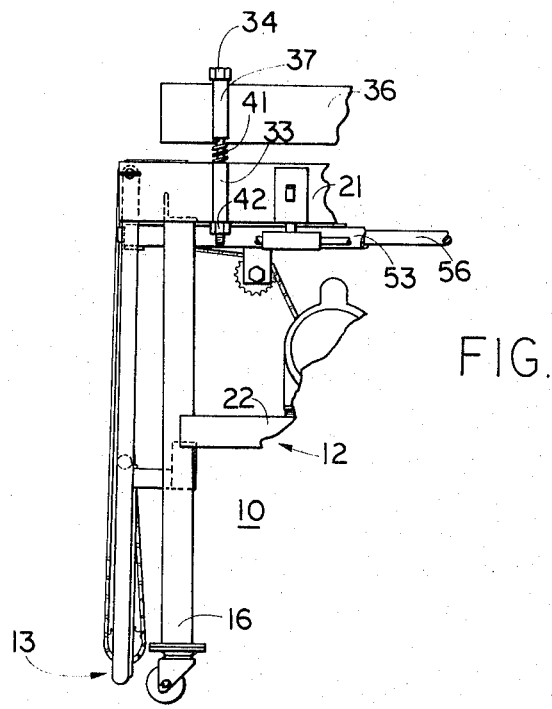
FIG. 4 is a fragmentary view in side elevation showing a cantilever frame in lowered position.

The side frames 13 and 14 are similar in construction and only the side frame 13 will be described in detail. As shown in FIG. 1, the side frame 13 includes lengthwise frame members 57 and 58 and transverse frame members 59, 61, and 62 connecting the lengthwise frame members 57 and 58 to form a rigid frame. Support bolts 63 are threaded in ends of the transverse frame member 62 in the manner one of the bolts 63 is shown in FIG. 6. Each support bolt 63 extends through a bore 64 in an extension plate 66 of the lower rectangular frame 21 so that the side frame 13 is pivotally mounted on the main frame 12 and can swing between the positions shown in FIGS. 2 and 4. Sprocket support plates 67 and 68 (FIG. 1) span the transverse frames 59 and 61 and rotatably support a sprocket 69. A socket support plate 70 is attached to the sprocket support plate 68 and extends downwardly therefrom as shown in FIG. 2. A short socket tube 71 is attached to the socket support plate 70 and can receive an end portion of the side frame support rod 56 when the side frame 13 is in the raised position of FIG. 2 to support the side frame 13.

A prop 73 is mounted on the side frame 13. The prop 73 includes an upright portion 74 and a rod portion 76 (FIG. 7). The rod portion 76 extends approximately perpendicularly to the lower section of the upright portion 74. As shown in FIG. 7, the rod portion 76 extends through an opening 77 in the lengthwise frame member 58 and is received inside the transverse frame member 61. A bolt 78 extends through a transverse bore 79 in the rod portion 76 and through diametral bores 81, one of which is shown in FIG. 7, in the transverse frame member 61 to hold the prop 73 in position on the side frame 13.

Figure 5:
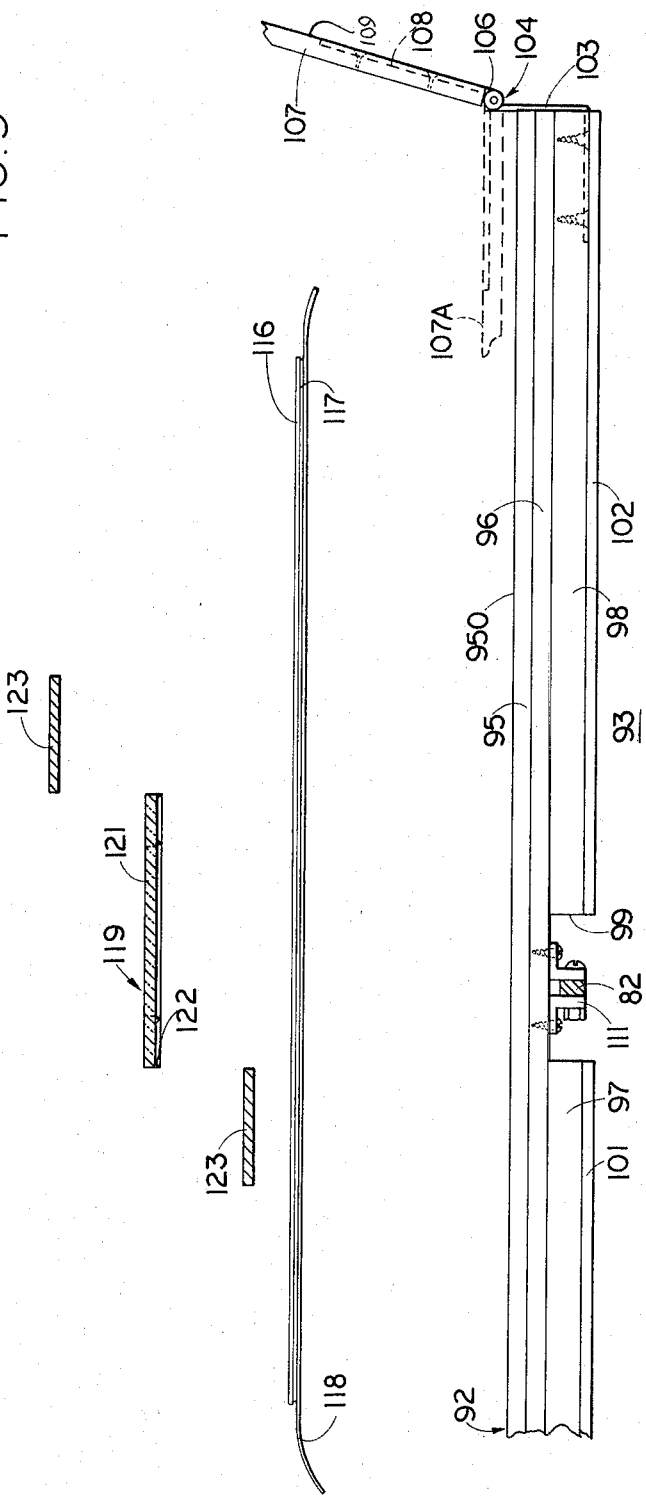
FIG. 5 is an exploded schematic view showing a moving table of the machine in association with a rubber sheet, a cutting tool and aligning tools, the cutting tool and the aligning tools being shown in section taken on the line 5—5 in FIG. 1.

A flexible drive element or chain 82 (FIG. 2) runs on the sprocket 69 and also runs on an idle sprocket 83, a drive sprocket 84 (FIG. 3), an idle sprocket 86 (FIG. 2) and an idle sprocket 87 rotatably mounted on the side frame 14. The drive sprocket 84 (FIG. 3) is carried by a shaft 88, which is driven by a motor 89 (FIG. 3) and gearing, not shown in detail, in a gear housing 91. The motor 89 and the gear housing 91 are mounted on the motor support angle frames 24 and 25. A portion of the drive chain 82 is attached to a table portion 92 of a carriage 93 (FIG. 2). As shown in FIG. 5, the carriage 93 can include a top panel 95 having a flat upper face 950, a second panel 96 underlying and supporting the top panel, spaced lengthwise panels 97 and 98 underlying the second panel and defining a slot 99 therebetween, and wear resisting metal panels 101 and 102 underlying the panels 97 and 98, respectively. The panels 101 and 102 are coplanar and form a bearing face for the table portion 92. The panels 95 and 96 can be formed of plywood or composition board or the like and the panels 97 and 98 can be of plywood. The metal panels 101 and 102 can be of steel. Hinge plates 103 of hinges 104 are attached to the panel 98. Hinge plates 106 of the hinges 104 are attached to a flat plate 107 of transparent plastic sheet material such as that known as LEXAN, and manufactured by General Electric Co., or that known as MERLON, and manufactured by Mobay Chemical Company. The plate 107 can be swung upwardly to the position shown in FIGS. 1 and 2 and in full lines in FIG. 5 at which it is supported by a prop 73A (FIG. 2) mounted on the side frame 14 and a lowered position shown in dashed lines in FIG. 5 at 107A at which the plate overlies the panel 95. The hinge plates 106 are recessed into slots 108 (FIG. 5) in the plate 107 so that an upper face 109 of the plate 107 is substantially continuous and flat. The chain 82 extends through the slot 99 in the carriage 93 and is attached to the bottom of the second panel 96 by means of chain anchors 111 attached to the panel 96 centrally thereof.

When the machine is used, indicia is cut out of a sheet 116 (FIG. 5) of rubber or rubber like material having on one face thereof a layer of pressure sensitive adhesive 117 and a protective sheet 118 of plastic material or the like underlying the adhesive layer 117. The rubber sheet 116 is positioned on the upper face 950 of the panel 95 of the carriage 93. Letter cutting dies or tools 119 are disposed on the rubber sheet 116 in the arrangement in which indicia is to be formed. The rubber sheet 116 and the cutting tools 119 can be of the type commonly used in forming letters for use in sandblasting grave markers. Each tool 119 includes a backing plate 121, which can be of transparent material, and cutting die members 122, the cutting die members being of a length sufficient to cut through the rubber sheet 116 without severing the protective sheet 118. Metal plates 123 are mounted on the rubber sheet 116 on either side of the cutting tools 119 to hold the cutting tools in alignment. The plates 123 are of a thickness equal to the thickness of the backing plate 121 of each cutting tool. The transparent plate 107 is lowered over the cutting tools and into flatwise face-to-face engagement with upper faces of the backing plates of the cutting tools, and the position of the cutting tools can be observed through the transparent plate 107 to ensure that the cutting tools are properly aligned before the cutting tools are forced into the rubber of the rubber sheet 116. The height of the hinge plates 103 is such that the upper face of the plate 107 at the hinges 104 is sufficiently low that the rollers 26–28 and 44–47 do not compress the plate at the hinges.

When the cutting tools are properly aligned under the lowered transparent plate 107, the motor 89 (FIG. 2) is energized to drive the chain 82 in a direction to advance the carriage 93 between the upper rollers 44, 46, and 47 and the lower rollers 26, 27, and 28. The motor 89 is controlled by a main control switch 154 having an operator arm 254 (FIG. 1) which can be swung clockwise to cause advance of the carriage 93 to the left as shown in FIG. 1, and can be swung counterclockwise to cause advance of the carriage to the right. The upper rectangular frame 36 is so set that the rollers urge the transparent plate 107 downwardly at the cutting tools 119 sufficiently to cause the cutting tools 119 to be depressed to cut letter indicia from the rubber sheet 116. The carriage is then advanced from between the rollers onto one of the side frames, and the transparent plate 107 is swung upwardly away from the cutting tools 119, and the cutting tools 119 and the plates 123 are removed. The carriage slides on the side frames as the carriage is advanced to and from the rollers 26, 27, 28, 44, 46, and 47, and the upper faces of the lower rollers 26, 27, and 28 are substantially aligned with the upper faces of the side frames 13 and 14 when in raised position so that the carriage slides from the side frames onto the lower rollers. When the cutting tools 119 and the plates 123 have been removed, a layer of pressure sensitive tape of the type commonly called masking tape (shown in FIG. 8 at 130) is laid down over the indicia to hold the indicia in alignment, and the indicia is removed from the remainder of the rubber sheet 116. As the letter indicia is removed, the protective plastic sheet 118 (FIG. 5) is peeled therefrom to expose the adhesive layer 117 on the letter indicia. The masking tape 130 and the letter indicia are transported to a grave marker 131 (FIG. 8) and the indicia 132 is placed on a face 133 of the grave marker with the adhesive layer holding each letter of the letter indicia on the grave marker 131. The face 133 can be a smooth or finished face. Then the grave marker 131 can be subjected to sandblasting in the usual fashion to provide permanent indicia on the grave marker. When the sandblasting is completed, the letter indicia can be removed to leave the completed grave marker.

Figure 9:
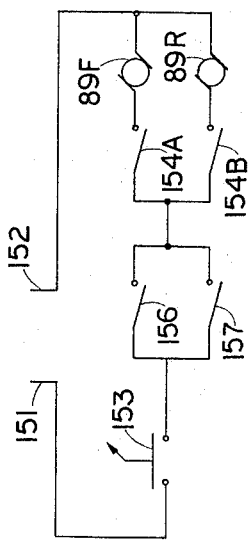
FIG. 9 is a schematic view showing electrical connections of the machine.

Electrical connections for the machine are shown in FIG. 9. Electric power is supplied by power leads 151 and 152. A main on-off switch 153 can be disposed in its other position when the machine is in use. The advance of the machine is controlled by the main control switch 154, (FIGS. 1 and 2), which has two sets of contacts 154A and 154B (FIG. 9). The control switch contacts 154A and 154B cannot operate to trigger a forward winding 89F or a reverse winding 89R of the motor 89 unless contacts of one of a pair of safety limit switches 156 and 157 are closed. As shown in FIGS. 1 and 2, actuators 154A and 157A of the limit switches 156 and 157 extend into the path of the carriage 93 so that, when the carriage 93 is gripped between the upper and lower rollers, at least one of the limit switches 156 and 157 is actuated to close the contacts thereof. When the carriage is in the position shown in FIGS. 1 and 2, the plate 107 is lowered, the switch actuator 156A of the limit switch 156 is pushed to one side in any convenient manner to close the contacts thereof, and the main control switch 154 is advanced in a direction to close the contacts thereof for energizing the motor winding to advance the carriage 93 to the left to cause the carriage to be advanced between the rollers causing cutting of the indicia as already described. When the carriage 93 comes free of the rollers, both of the limit switches 156 and 157 are released to open position de-energizing the motor windings 89F and 89R, as shown in FIG. 9, to stop advance of the carriage.

The indicia forming machine illustrated in the drawings and described above is subject to structural modification without departing from the spirit and scope of the appended claims.

Having described my invention, what I claim as new and desire to secure by letters patent is:

1. A machine for forming indicia from a sheet of rubber-like material which comprises a carriage including a table portion having a lower bearing face and an upper sheet supporting face and a plate of transparent material adapted to overlie the sheet supporting face, the sheet supporting face being arranged to support the sheet with cutting tools arranged thereon, a frame, vertically spaced rollers mounted on the frame, and means for advancing the carriage between the rollers to cause the plate to be urged against the cutting tools to cause the cutting tools to cut indicia from the sheet.

2. A machine as in claim 1 wherein the plate is hinged to the table portion along an edge of the table portion and is swingable between a lowered position overlying the sheet supporting face and a raised position.

3. A machine as in claim 1 wherein the frame includes a horizontal guide portion having an upper face aligned with an upper edge of a lower one of the rollers, and the carriage slides on the upper face of the guide portion.

4. A machine as in claim 3 wherein the means for advancing the carriage includes a drive element attached to the carriage, and means for directing the drive element between the rollers, there being a slot at the bearing face of the table portion of the carriage receiving the drive element.

* * * * *